US010928268B2

(12) United States Patent
McNeil

(10) Patent No.: US 10,928,268 B2
(45) Date of Patent: Feb. 23, 2021

(54) APPARATUS AND METHODOLOGIES FOR LEAK DETECTION USING GAS AND INFRARED THERMOGRAPHY

(71) Applicant: LINERIDERS INC., Grand Prairie (CA)

(72) Inventor: Phil McNeil, Grande Prairie (CA)

(73) Assignee: Phil McNeil, Grand Prairie (CA)

( * ) Notice: Subject to any disclaimer, the term of this patent is extended or adjusted under 35 U.S.C. 154(b) by 159 days.

(21) Appl. No.: 16/302,810

(22) PCT Filed: May 18, 2017

(86) PCT No.: PCT/CA2017/050601
§ 371 (c)(1),
(2) Date: Nov. 19, 2018

(87) PCT Pub. No.: WO2017/197521
PCT Pub. Date: Nov. 23, 2017

(65) Prior Publication Data
US 2019/0178743 A1      Jun. 13, 2019

Related U.S. Application Data

(60) Provisional application No. 62/338,313, filed on May 18, 2016.

(51) Int. Cl.
*G01J 3/32* (2006.01)
*G01N 25/48* (2006.01)
*G01M 3/00* (2006.01)
*G01M 3/22* (2006.01)

(52) U.S. Cl.
CPC ............... *G01M 3/002* (2013.01); *G01J 3/32* (2013.01); *G01M 3/226* (2013.01); *G01N 25/4873* (2013.01)

(58) Field of Classification Search
CPC .......... G01M 3/002; G01M 3/226; G01J 3/32; G01N 25/4873
See application file for complete search history.

(56) References Cited

U.S. PATENT DOCUMENTS 4,715,213 A * 12/1987 McGreehan ............ G01M 3/20
277/320
4,813,268 A * 3/1989 Helvey .................. G01M 3/205
73/40.7
5,010,761 A * 4/1991 Cohen .................... G01M 3/229
73/40.7
5,029,463 A * 7/1991 Schvester ............. G01M 3/227
73/40.7

(Continued)

FOREIGN PATENT DOCUMENTS

EP          1202042 B1     1/2004

*Primary Examiner* — David P Porta
*Assistant Examiner* — Djura Malevic
(74) *Attorney, Agent, or Firm* — Parlee McLaws LLP; Chi Fai Andrew Lau

(57) ABSTRACT

Apparatus and methodologies relating to improved gas detection in closed systems are provided. More specifically, the present systems provide for the mixing, conditioning and production of a detection gas comprising, for example, predetermined ratios of nitrogen and methane gas, such predetermined ratios operative for enhancing imaging of gas leaks detected using infrared thermography imaging.

23 Claims, 6 Drawing Sheets

(56) References Cited

U.S. PATENT DOCUMENTS

| | | | | |
|---|---|---|---|---|
| 5,326,975 A * | 7/1994 | Barna | G01N 21/71 | 250/372 |
| 5,430,293 A * | 7/1995 | Sato | G01M 3/38 | 250/330 |
| 5,476,115 A | 12/1995 | Lalumandier et al. | | |
| 5,528,923 A * | 6/1996 | Ledez | G01N 7/14 | 73/19.02 |
| 5,656,813 A * | 8/1997 | Moore | G01N 21/3504 | 250/330 |
| 5,681,983 A * | 10/1997 | Seigeot | G01M 3/202 | 73/40.7 |
| 5,789,754 A * | 8/1998 | Cathey | G01N 21/73 | 250/372 |
| 5,939,619 A * | 8/1999 | Achter | G01M 3/229 | 73/40.7 |
| 6,050,133 A * | 4/2000 | Achter | A61L 2/28 | 73/40.7 |
| 6,142,162 A * | 11/2000 | Arnold | G05D 11/133 | 137/101.19 |
| 6,279,384 B1 * | 8/2001 | Heikkinen | G01M 3/229 | 73/40.7 |
| 6,450,011 B1 * | 9/2002 | Mayer | G01M 3/329 | 73/49.3 |
| 6,460,405 B1 * | 10/2002 | Mayer | G01M 3/20 | 73/40.7 |
| 6,609,414 B2 * | 8/2003 | Mayer | G01M 3/227 | 73/40.7 |
| 6,763,702 B2 * | 7/2004 | Chien | G01M 3/226 | 73/40.7 |
| 6,966,216 B2 * | 11/2005 | Hotta | G01M 3/227 | 73/40 |
| 7,151,260 B2 * | 12/2006 | Markham | G01N 21/3504 | 250/339.08 |
| 7,308,819 B2 * | 12/2007 | Kamio | H01J 9/241 | 73/23.2 |
| 7,335,885 B2 * | 2/2008 | Wong | G01J 3/108 | 250/339.03 |
| 7,403,283 B2 * | 7/2008 | Sogan | G01J 3/443 | 356/316 |
| 7,446,317 B2 * | 11/2008 | Doyle | G01N 21/031 | 250/339.13 |
| 8,759,767 B2 * | 6/2014 | Carter | G01N 21/3504 | 250/338.1 |
| 9,207,170 B2 * | 12/2015 | Trollsch | G01N 21/3504 | |
| 9,297,758 B2 * | 3/2016 | Frigo | G01N 21/3504 | |
| 9,310,295 B2 * | 4/2016 | Tabaru | G01N 21/39 | |
| 10,408,763 B2 * | 9/2019 | Gamache | G01M 3/20 | |
| 2003/0025081 A1 * | 2/2003 | Edner | G01N 21/3518 | 250/339.09 |
| 2007/0157704 A1 * | 7/2007 | Jenneus | G01M 3/226 | 73/40.7 |
| 2009/0200466 A1 * | 8/2009 | Mammen | G06T 5/50 | 250/330 |
| 2009/0277249 A1 * | 11/2009 | Polster | G01M 3/229 | 73/40.7 |
| 2009/0294666 A1 * | 12/2009 | Hargel | G01J 5/0014 | 250/330 |
| 2010/0018293 A1 * | 1/2010 | Monkowski | G01M 3/38 | 73/40.7 |
| 2010/0230593 A1 * | 9/2010 | Hill, Jr. | G01N 21/3504 | 250/330 |
| 2010/0231722 A1 * | 9/2010 | Hill, Jr. | G01J 3/0264 | 348/164 |
| 2010/0301214 A1 * | 12/2010 | Jonsson | G01N 21/3518 | 250/332 |
| 2011/0247400 A1 * | 10/2011 | Schwartz | G01M 3/38 | 73/40.7 |
| 2011/0284742 A1 * | 11/2011 | Barker | G01M 3/226 | 250/303 |
| 2012/0048001 A1 | 3/2012 | Pawlyk | | |
| 2013/0250124 A1 * | 9/2013 | Furry | G01M 3/04 | 348/164 |
| 2013/0286213 A1 * | 10/2013 | Cetin | G01N 21/3504 | 348/164 |
| 2015/0068288 A1 * | 3/2015 | Gaudet | G01M 3/22 | 73/40.7 |
| 2015/0362467 A1 * | 12/2015 | Wetzig | G01M 3/205 | 73/25.03 |

* cited by examiner

APPARATUS AND METHODOLOGIES FOR LEAK DETECTION USING GAS AND INFRARED THERMOGRAPHY

CROSS REFERENCES

This Application claims priority to U.S. Provisional Patent Application No. 62/338,313, filed May 18, 2016, entitled "System and Method for Leak Detection", the entirety of which is hereby incorporated by reference.

FIELD

Apparatus and methodologies relating to improved gas detection in closed systems are provided. More specifically, the present systems provide for improved mixing, conditioning, and introducing of detection gases for enhanced infrared imaging of gas leaks.

BACKGROUND

Fugitive gas leaks in industrial facilities, such as oil and gas exploration and production facilities, are becoming increasingly important, particularly where such gas leaks can involve hydrocarbon vapors, volatile organic compounds (VOCs), or other dangerous gases that are invisible or odorless to the human observer. Further, because such leaks can result in substantial greenhouse gas emissions and environmental risks to communities in the vicinity of the facility, regulatory agencies require facilities to comply with increasingly stringent leak detection protocols. As a result, millions of dollars are spent annually to perform leak detection surveys on large facilities.

Unfortunately, current detection processes for surveying large facilities are not efficient and are extremely time-consuming. Because known survey procedures often require manual sampling of gas from every potential leak point, surveys are ineffective and prone to significant error. Moreover, recent explosions at oil and gas facilities pose very real health risks to personnel, creating an urgent need for improved gas leak detection systems. It would be advantageous for such improved leak detection systems to be used preventatively (e.g. before the commissioning of facilities), and routinely (e.g. ongoing maintenance) for efficient and effective leak detection early and often.

Many types of leak detection devices operative to identify potentially hazardous gas leaks are known and commercially available. Such devices vary widely, depending upon the type of gas being detected and the system being surveyed (e.g. industrial plants, refineries, treatment facilities, etc.). Commonly, the use of gas detection devices involves purging the surveyed system with a tracer gas, and then utilizing the gas-sensing device (e.g. gas "sniffers") to detect whether the tracer gas leaks from the system. Unfortunately, known devices often require up-close surveying at each individual joint and possible leak point, making them too dangerous, labor intensive, and costly to be used effectively in gas detection of large facilities. Further, if tracer gases displace oxygen in the facility, personnel can be at risk of suffocation when surveying too close to the vicinity of the leak.

Another common type of gas leak detection comprises the use optical imaging systems including both passive and active infrared thermography (IRT) cameras used to detect gas leaks by viewing infrared images of the leaking gas plumes. For example, active IRT systems typically involve scanning a laser across the survey area and then observing backscattered light, while passive IRT systems involve processing and measuring spectral changes in pixelated images (i.e. specific spectral signatures can indicate the presence of target gases). Infrared imaging devices, such as the IR cameras disclosed in United States Patent Application No. US2013/0113939, are becoming increasingly popular for visualizing leaks, particularly hydrocarbon gas leaks. Although such systems can be used to detect gas plumes from a distance, making them less laborious (and safer) than 'sniffer' devices, the accuracy and efficiency of such systems depend upon the quality of the image produced. To date, known IRT gas detection systems are unable to provide sufficiently clear visualization of gas concentrations for use in leak detection of large facilities, particularly where the gas plumes are detected against the open sky or other large backgrounds. Moreover, the use of known IRT system for detecting small leaks, varying in concentration, type, temperature and flow rate of the fugitive gas, are less than optimal.

Various tracer gases are known, the use of which can depend upon the particular detection device being used. Because helium is non-flammable, non-toxic, and is rarely present in conventional industrial facilities, it has become a popular tracer gas, particularly when mixed with a carrier gas. Given that the pre-mixing of carrier/tracer gases is not always accurate or effective, automated gas-blending systems have been developed to pre-mix helium tracer gas with a desired carrier gas prior to providing the detection gas to the system being surveyed. As described in U.S. Pat. No. 5,476,115, such systems can be used to automatically control temperature and pressure of the tracer gases being supplied to the system being surveyed. Such systems generally comprise the positioning of temperature and pressure sensors, along with flow meters, within the detection gas flow line, such that temperature, pressure and gas flow rates of the pre-mixed gas can be adjusted (in response to measurements taken from the sensors/meter) using flow restriction valves. Such systems, however, fail to accurately measure and control the specific ratios of carrier/tracer gases in the detection gas, automatically adjusting the ratios in real-time, for optimal visualization of the detection gas when it leaks from the system. Moreover, although the use of helium as a tracer gas is relatively safe and effective, helium is widely used across a variety of industries and, as a non-renewable resource, is in high demand. Costs of helium are ever increasing, making its use as a tracer gas too expensive and relatively impractical for use in large facilities, and have resulted in many operators opting to dispense with helium leak testing.

There is a need for practical and efficient gas detection systems capable of surveying large facilities to detect fugitive hydrocarbon gas leaks therefrom. It is desirable that such systems are not limited by the type, concentration, temperature or flow rates of the fugitive hydrocarbons.

SUMMARY

According to embodiments herein, a method of detecting gas leaks in a closed system is provided, the method comprising providing at least one carrier gas and at least one tracer gas, mixing at least a portion of the tracer gas and at least a portion of the carrier gas to form a detector gas having a specific, predetermined ratio of carrier gas to tracer gas, determining, from a continuous sub-stream of the detector gas, the ratio of carrier gas to tracer gas within the detector gas, and adjusting the portion of the carrier gas, the portion of the tracer gas, or a combination thereof, to maintain the ratio of carrier gas to tracer gas within the detector gas, introducing the detector gas to the closed system, and obtaining infrared thermography images of the closed system to detect gas leaking from the system. It is an advantage of the present methods that infrared thermography imaging may be used to ensure the ratio of carrier gas to tracer gas within the detector gas is maintained, enhancing the visualization of the detector gas as detected using infrared thermography imaging. As such, the present method may further comprise determining the ratio of carrier gas to tracer gas in the produced detector gas by obtaining infrared thermography images of the sub-stream of detector gas prior to introducing the detector gas to the closed system.

In some embodiments, the carrier gas may comprise an inert gas, and may be nitrogen gas. The tracer gas may comprise a natural gas, and may be methane gas. The detector gas may comprise a predetermined ratio of carrier-to-tracer gas, said ratio being determined to optimize visualization of the detector gas when imaged using infrared thermography imaging. In some embodiments, the carrier-to-tracer gas may be in the range of about 2% to about 14.2%, and preferably in the range of about 7.2% to about 10%. In some embodiments, the detector gas may be heated to at least between about 40° C.-about 50° C., and preferably to about between about 40° C. In some embodiments, the volumetric flow rate of the detector gas may be in the range of about 5 m$^3$/min to about 40 m$^3$/min, and preferably about 20 m$^3$/min.

According to embodiments herein, an apparatus for detecting a gas leak in a closed system is provided, the apparatus comprising a source of at least one carrier gas for supplying the at least one carrier gas to a carrier gas flow line, a source of at least one tracer gas for supplying the at least one tracer gas to a tracer gas flow line, at least one detector gas line for receiving a detector gas comprising at least a portion of the at least one carrier gas mixed with and at least a portion of the at least one tracer gas, and for introducing said detector gas to the closed system, and at least one controller, operably connected to the sources of carrier and tracer gases for continuously detecting and adjusting, in real-time, the ratio of carrier gas to tracer gas within the detector gas being produced and at least one infrared thermography camera for obtaining infrared thermography images of the system to detect detector gas leaking from the closed system.

In some embodiments, the present apparatus may comprise a mixer, such as a static mixer, for receiving and mixing the carrier and tracer gases at the molecular level. The apparatus may further comprise additional gas detection devices including gas chromatographers, mass spectrometers, laser methane detectors, or a combination thereof.

DESCRIPTION OF EMBODIMENTS

According to embodiments herein, improved apparatus and methods for detecting gas leaks in closed systems are provided, such apparatus and methods being operative to continuously detect and adjust, in real-time, the specific ratio of carrier gas to tracer gas provided to the systems in order to optimize visualization of the detection gas when it leaks from the system. It is an advantage of that the present apparatus and methods may produce a detector gas that can be quickly and effectively visualized in large areas of the closed system using optical imaging, such as infrared thermography cameras. In some embodiments, the present apparatus and methods may enhance the visualization of gas plumes being leaked from the system by utilizing infrared thermography imaging to determine the specific ratios of carrier-to-tracer gas in the detector gas being produced as well as to enhance the images of gas plumes leaking from the system. The present apparatus and methods may provide a detector gas comprising at least an inert carrier gas, such as nitrogen, and a natural gas tracer gas, such as methane.

Figure 1:
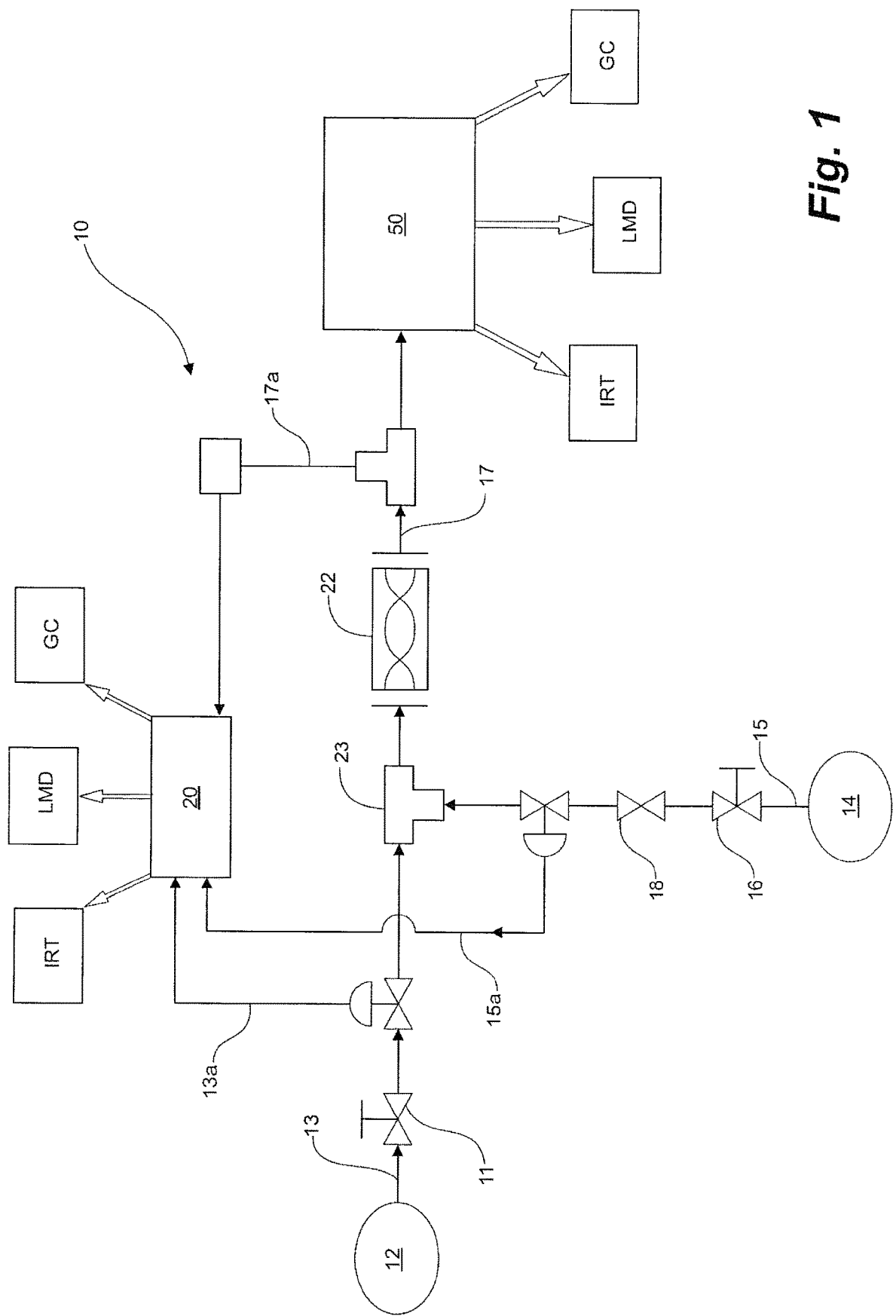
FIG. 1 is an example flowchart of a system according to embodiments herein, the system operative to effectively mix a tracer gas and a carrier gas in predetermined ratios for system purging and leak detection using imaging means.

Having regard to FIG. 1, the present leak detection system 10 is provided, wherein the system comprises the use of at least one carrier gas and at least one tracer gas to produce an improved detector gas for leak detection in a closed system 50, wherein the ratio of carrier-to-tracer gas may be continuously controlled and adjusted, in real-time, for optimal gas visualization using infrared thermography imaging. According to embodiments herein, at least some or all of the carrier gas and tracer gas may be mixed to produce the detector gas before the detector gas is delivered to the system being surveyed.

In some embodiments, the carrier gas may comprise any inert gas, such as nitrogen gas, and may be provided from a source of supply 12. For example, the carrier gas may be sourced independently (e.g. from a portable source, such as a pre-filled tank), or otherwise sourced from the site being surveyed. The carrier gas may be supplied in liquid form, the liquid being pumped and vaporized to provide the carrier gas. The carrier gas may be supplied to through a carrier gas flow line 13, whereby flow of the carrier gas into the line 13 may be generally controlled through at least one control valve 11 as would be known in the art, the valves further operative to prevent backflow of the carrier gas in line 13. For example, one or more control valves, such as a gate valve and/or ball valve, may be provided downstream of supply source 12. In some embodiments, a positive displacement meter, or other known flow meter, may be used to measure the volumetric flow rate of the carrier gas into flow line 13. Further, temperature and pressure sensors may be used to measure the temperature and pressure of the carrier gas in flow line 13. Each of the positive displacement meter, temperature and pressure sensors may be operably in communication with at least one or more controllers 20 (as described below), such that temperature, pressure, and flow rate measurements of the carrier gas in flow line 13 may be detected by the meter, and transmitted to one or more controllers (as described below).

In some embodiments, the tracer gas may comprise a natural gas, such as methane gas (herein referred to interchangeably as "methane" or "CH$_4$"), and may be provided from a source of supply 14. For example, the tracer gas may be sourced independently (e.g. from a portable source, such as a pre-filled tank), or otherwise sourced from the site being surveyed, e.g. from production pipelines or other sources of natural gas. The tracer gas may be supplied through a tracer gas flow line 15, whereby flow of the tracer gas into the line 15 can be controlled through at least one control valve 16 as would be known in the art, the valves further operative to prevent backflow of the tracer gas in line 15. For example, one or more control valves 16, such as a gate valve and/or ball valve, may be provided downstream of supply source 14. Preferably, one or more additional secondary valves 18, such as needle valves, may be provided for making fine adjustments to the flow of tracer gas in line 15. Such additional valves 18 may be provided downstream of control valves 16. In some embodiments, a positive displacement meter, or other known flow meter, may be used to measure the volumetric flow rate of the tracer gas into flow line 15. Further, temperature and pressure sensors may be used to measure the temperature and pressure of the tracer gas in flow line 15. Each of the positive displacement meter, temperature and pressure sensors may be operably in communication with at least one or more controllers 20 (as described below), such that temperature, pressure, and flow rate measurements of the tracer gas in flow line 15 may be detected by the meter, and transmitted to one or more controllers 20 (as described below). It should be understood that other componentry known in the art including, without limitation, heat exchangers, pressure relief valves, gauges, bleed valves etc., may be required or desired to operate the present apparatus and methods, such componentry not shown herein.

According to embodiments herein, the ratio of carrier gas to tracer gas may be predetermined, depending upon the requirements of the closed system 50 facilities being surveyed and the time in which the system is being surveyed (e.g. pre-commission or ongoing maintenance), and may be automatically adjusted, in real-time, in order to adapt to the system and to optimize leak detection within the system. In some embodiments, each of the carrier gas and tracer gas control valves 11,16 and secondary valves 18 may be independently controlled and adjusted as the system is being surveyed in order to optimize the ratio of carrier gas to tracer gas in the detector gas being produced. Accordingly, where desired, broad adjustments to the sourced carrier gas and/or tracer gas may be performed via one or more control valves 11,16 positioned in flow lines 13,15, respectively, while fine adjustments to the sourced tracer gas may be performed via one or more secondary valve 18 (e.g. to finely adjust the flow of tracer gas, and thus the concentration of tracer gas, to predetermined thresholds within the detector gas). Such adjustments may be performed manually, automatically, or a combination thereof.

More specifically, in some embodiments, at least one controller 20 may be provided to receive at least the temperature, pressure, and volumetric flow rate information from each of the temperature and pressure sensors and positive displacement meters along each of the carrier and tracer gas lines 13,15, such that the particular parameters of each gas may be measured and monitored from the controller(s) 20. Alternatively, as schematically represented in FIG. 1, each at least one controller 20 may be operative to receive at least a portion of the carrier gas from the carrier gas flow line 13, and at least a portion of the tracer gas from the tracer gas line 15, such that the particular parameters of each gas may be measured and monitored from the controller(s) 20. For example, a sub-stream of carrier gas may be diverted from the carrier gas line 13 and provided to controller(s) 20 via carrier gas sub-stream flow line 13a. A sub-stream of tracer gas may be diverted from the tracer gas line 15 and provided to controller(s) 20 via a tracer gas sub-stream flow line 15a. The at least one controller(s) 20 may be programmed to, based upon the feedback information received from the sub-stream flow lines 13a,15a, adjustably control the one or more control valves 11,16 and secondary valves 18, to achieve a predetermined ratio of carrier gas to tracer gas in the detector gas being produced (e.g. the nitrogen-to-methane ratio). The predetermined ratio of carrier gas to tracer gas may be adjusted, in real-time, based upon the system being surveyed and the visualization results of the infrared thermography imaging (as described in detail below). For example, it is contemplated that the particular carrier-to-tracer ratio may be increased or decreased during leak detection operations in order to, amongst other things, optimize the infrared visualization of gas plumes leaking from the system being surveyed. Advantageously, where the carrier gas and tracer gas sources 12,14 may provide the gases under variable conditions, the at least one controller(s) 20 can automatically detect and accommodate for the variable conditions, maintaining continuous and dynamic control of the ratios within the detector gas being produced. In some embodiments, at least two controllers 20 may be provided, each controller operative to independently receive information about the carrier gas and tracer gas, respectively. By way of example, a supervisory control and data acquisition (SCADA) system, or other such controller/processor system, may be provided to monitor overall system parameters and to control the at least one controller(s) 20. It should be understood that each of the componentry within the present system 10 may be operatively connected to the controller(s) 20, such that such componentry (e.g. heat exchangers, pressure relief valves, gauges, bleed valves etc.) may be activated or deactivated by the controller(s) 20.

Each of the carrier gas and tracer gas flow lines 13,15 may, at their outlet ends, be in communication with at least one mixer 22, such as a static mixing spool, optimized for the continuous blending of the carrier and tracer gases at the molecular level to produce the present detector gas. The at least one mixer 22 may serve to uniformly mix the carrier and tracer gases, providing more consistent gas signatures and improved imaging results. In some embodiments, the carrier gas and tracer gas lines 13,15 merge, such as via a wye "Y" lateral fitting 23 or other type of line junction operative to join two branch lines into one gas stream, prior to the mixer 22. Where applicable, the mixer 22 may be provided downstream of the merge junction 23. In other embodiments, the carrier gas and tracer gas lines 13,15 may remain separated until being introduced to the mixer 22, such that each of the carrier and tracer gas lines 13,15 are in direct communication with, and combined within, the mixer 22. Mixer 22 may have at least one outlet end for directed blended detector gas, via detector gas line 17, to the system being surveyed.

In some embodiments, at least a portion of the produced detector gas blended in mixer 22 may be directed from the detector gas line 17 and fed back to the one or more controllers 20. The sub-stream detector gas returned to the controllers 20 via sub-stream detector flow line 17a may be further analyzed to determine whether the predetermined ratio of carrier gas to tracer gas is being achieved and maintained. In such embodiments, the at least one controllers 20 may comprise one or more gas analyzers, such analyzers including, without limitation, gas chromatographers (GC), mass spectrometers (MS), or a combination thereof, laser methane detectors (LMD), or the like. More specifically, analyzer(s) may be operative to determine and maintain the ratio of carrier to tracer gases within the produced detector gas (i.e. the concentration of methane, the temperature, and the pressure of the output detector gas stream 17), and to automatically relay the concentrations, temperatures and pressures, via a feedback system, to the at least one controller(s) 20 for adjustment. As such, the present system may continuously and dynamically regulate the temperature, pressure and flow rates of each of the carrier and tracer gases entering the system being surveyed by performing real-time adjustments to the concentration, temperature and pressure based upon the particular parameters detected in the output stream of detector gas 17a. As above, broad adjustments to the sourced carrier gas and/or tracer gas may be performed via one or more control valves 11,16 positioned downstream of the gas supply source 12,14. Further, fine adjustments to the sourced carrier gas and/or tracer gas may be performed via one or more secondary valve 18 (e.g. to finely adjust the flow of methane, increasing the concentration of methane to a pre-determined threshold within the detector gas). Temperature control may be made by activating or deactivating heating componentry in one or both gas flow lines 13,15.

In some embodiments herein, at least a portion of the produced detector gas blended in mixer 22 being directed from the detector gas line 17 and fed back to the one or more controller(s) 20 via sub-stream detector flow line 17a may be further analyzed and processed using optical imaging techniques, such as infrared thermography imaging (IRT), prior to being introduced to the closed system 50. For example, one or more infrared thermography cameras operatively connected to the at least one controller(s) 20 may be adapted to obtain infrared thermography images of the detector gas sub-stream 17a, whereby the images may utilized to determine whether the predetermined ratio of carrier gas to tracer gas is being maintained (i.e. whether optimal imaging of the detector gas is being achieved prior to being introduced into the system). In such embodiments, the one or more infrared thermography cameras may be operatively connected to the controller(s) 20, such that controller(s) 20 may be programmed to receive the infrared thermography images and to process the images to determine carrier-to-tracer gas ratios in the detector gas being produced. As is known, optical gas infrared thermal imaging provides accurate real-time imaging of otherwise invisible gases escaping into the environment from safe distances (e.g. from at least approximately 10-30 m). Advantageously, the infrared thermography information from the sub-stream of detector gas 17a may be utilized to enhance visualization of the detector gas prior to the gas being introduced to the closed system 50 for leak detection. For example, the present apparatus and method may, based upon the pre-determined visualization results of the detector gas, adjust the concentration, temperature or pressure of the detector gas before (or during) its introduction to the system. The one or more infrared thermography cameras may comprise known cameras in the art, such as at least one GF 320 camera (FLIR Systems, Inc., as disclosed in U.S. Pat. No. 7,649,174) or EyeCGas camera (Opgal Optronic Industries). In some embodiments, the one or more infrared thermography cameras may be equipped with hydrocarbon and/or VOC filters for optimized imaging. The present detector gas line 17 may be connected to the system being surveyed via any connection means known in the art. It would be understood that the number of cameras, and their positioning relative to the closed system, may be determined based upon the system being surveyed and in a manner to optimizing imaging thereof (e.g. cameras may be angled to obtain imaging of one or more possible leak points within the system).

In some embodiments, the carrier gas and tracer gas sources 12,14, and gas mixing system 22 may comprise a portable system mounted on a single or multiple trailers for easy transport to the survey site. Compressed tracer and carrier gas sources may be secured to the trailers along with the required componentry including, without limitation, heaters, gas lines, mixer, valves, etc. In such cases, compressed carrier and tracer gases first flow through a regulator also mounted on the trailer to bring the gases down to a useable pressure before entering the mixer. As such, the trailer system may contain flow sensors and gas analyzers to monitor the flow rates and characteristics of carrier and tracer gases, as well as temperature sensors to monitor gas temperature. Adjustment of flow, tracer/carrier gas ratios, and temperature are automated and performed as described.

The present apparatus and methodologies will now be described in more detail having regard to the Figures herein and Examples below.

EXAMPLES

According to a first Example, the present apparatus and methodologies produce an improved detector gas having a leak discharge with characteristics that are sufficiently distinguishable from the environment being surveyed such that the leaks can be detected using, at least, optical infrared thermography techniques. The produced detector gas may comprise at least one carrier gas and at least one tracer gas, the ratio of carrier gas to tracer gas being optimized to enhance the infrared thermography visualization of the detector gas.

Figure 2:
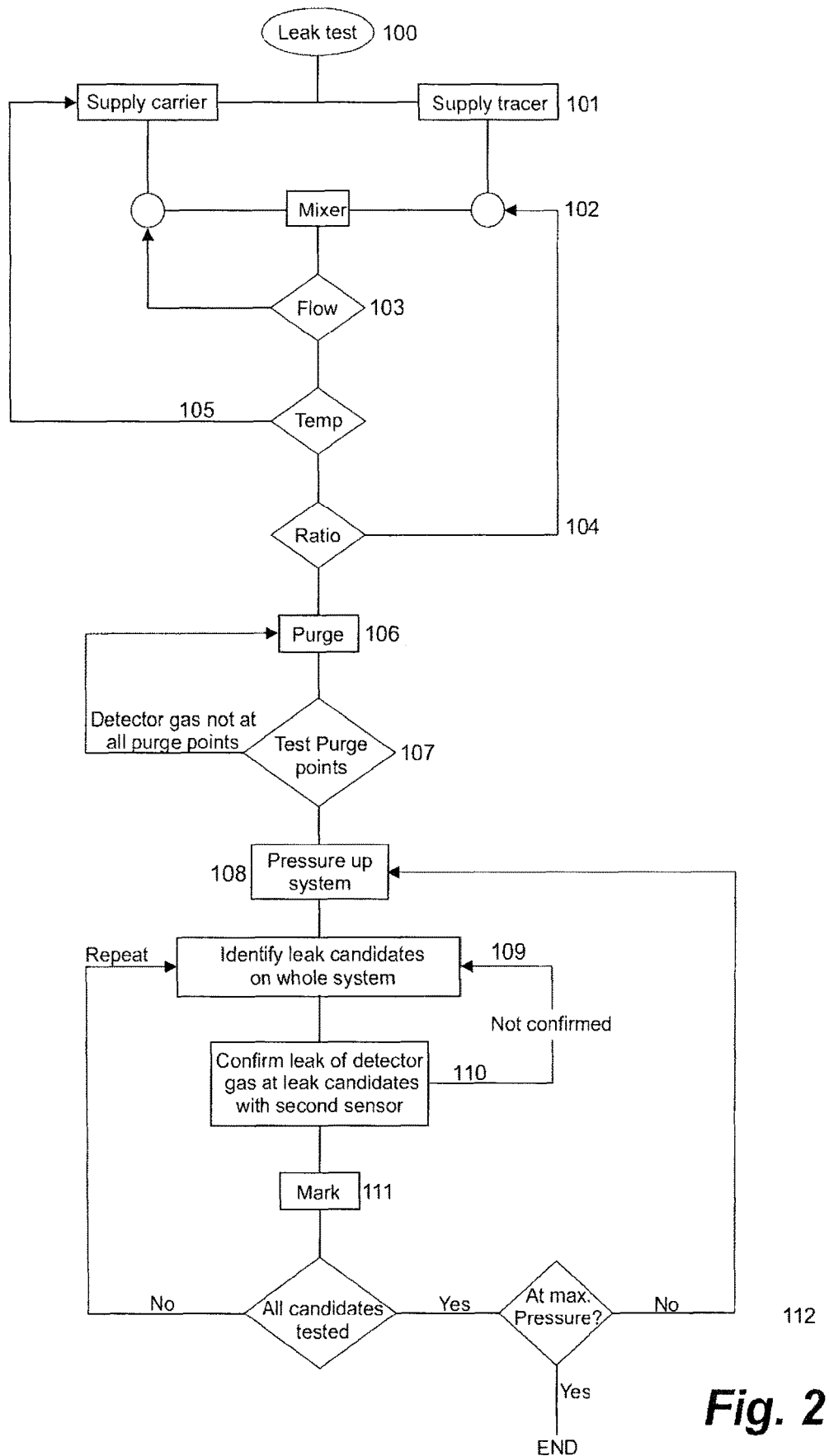
FIG. 2 is an example flowchart representing the present testing methods according to embodiments herein.

Having regard to FIG. 2, leak detection processes 100 may commence by supplying the at least one carrier gas and the at least one tracer gas to the system via their respective gas flow lines 101. The at least one carrier and tracer gases may be introduced to mixer 102, such that the gases may be blended at the molecular level prior to being introduced into the closed system 50 being surveyed. As above, the volumetric flow rates, temperature, and concentrations of carrier-to-tracer gases may be monitored and controlled via an automatic feedback loop. The control of flow rates, temperature and concentrations may be performed to optimize infrared thermography visualization of the detector gas, and may depend in part on the parameters (e.g. size, configuration) of the particular closed system 50 being tested. The flow rate, temperature and concentration of carrier-to-tracer gases within the detector gas may be predetermined for the particular system, and the present system may be automatically programmed to maintain the predetermined threshold in real-time during the leak detection test.

For example, volumetric flow of the detector gas exiting the mixer may be monitored. Where adjustment of the detector gas flow is required, feedback to the carrier gas flow line may be communicated, increasing or decreasing flow thereof 103. The concentration of carrier gas-to-tracer gas in the detector gas exiting the mixer may be monitored. Where adjustment of the ratio of carrier gas to tracer gas requires adjustment (i.e. the concentration of ratio within the detector gas being produced), feedback to the tracer gas flow line may be communicated, increasing or decreasing the flow thereof 104 (e.g. increasing the flow of tracer gas results in a corresponding increase in the concentration of tracer gas in the detector gas exiting the mixer). It would be understood that steps 103 and 104 may occur continuously and simultaneously. Further, it has been discerned that the visualization of the detector gas may be improved if the temperature of the gas is increased. As such, the temperature of the detector gas exiting the mixer may be monitored. Where adjustment of the detector gas temperature is required, feedback to temperature controls in the carrier gas and/or tracer gas flow lines may be communicated, increasing or decreasing the temperature thereof 105.

Where appropriate, the closed loop system 50 being surveyed for gas leaks may be purged of any resident gases in the system 106, such that the detector gas may be introduced. Purging of the system can comprise providing the presently improved detector gas to the closed system in a temperature and pressure operative to remove as much resident gas as possible. Known gas detectors, such as LMS, mass spectrometers, or gas chromatographers, can be positioned at various purge points in the closed system to ensure that the entire system has been purged 107, and that any residual gases within the closed system have been expelled. In particular, it is desirable to ensure that no oxygen remains within the closed system being surveyed.

Once purged, the closed system may be shut-in and pressured up in preparation of the present leak detection 108. Controller(s) are activated to ensure adequate pressure (flow), temperature and concentrations of detector gas are achieved (Steps 103,105,105). If the flow, temperature, and carrier-to-tracer gas ratios are determined to be within specified pre-determined parameters (e.g. as may be determined by infrared thermography imaging and, where applicable, secondary gas analyzers), the process continues. If the any one of the foregoing is determined to not be within the specified parameters, the one or more controller(s) are operative to adjust the flow, temperature, or a combination thereof, of one or both of the carrier and tracer gases (i.e. to repeat Steps 103,104,105).

Where leaks are present in the closed system, the present signature detector gas will be emitted and will be visualized in the infrared thermography images generated by the one or more cameras 109. In some embodiments, leaks may be confirmed visually (by personnel performing the survey onsite), automatically via one or more processors operatively connected to the one or more cameras, or both. Because the one or more infrared thermography cameras are configured to detect volatile organic compounds (VOCs), such as methane tracer gas, leaks of non-VOCs, such as nitrogen, will not be readily distinguishable nor relevant, compared to the image background.

As above, plumes of leaking detector gas emitted from the system being surveyed may be visualized using infrared thermography images generated by the one or more infrared thermography cameras. For example, one or more infrared thermography cameras may be positioned at one or more locations for gas leak detection within the closed loop system, such infrared thermography cameras being positioned in a manner to provide quick visualization of large areas of the test system. In some embodiments, the one or more infrared thermography cameras may be equipped with hydrocarbon and/or VOC filters for optimized imaging.

In some cases, gas plumes of emitted detector gas leaking from the closed system may not be detected by the one or more infrared thermography cameras, but may be detected by a pressure drop in the closed system (such drop being indicative of a small gas leak). Alternatively, supplemental detection of leak points in the closed system may be required where the system does not have adequate purge points, and therefore may not have sufficient quantities of the detector gas for leaks to be visualized by the infrared thermography cameras. In such cases, the present apparatus and methodologies may further comprise the using secondary sensing systems such as, without limitation, additional gas detection devices known in the art, such as an ultrasonic leak detection (USD, e.g. CTRL SYS UL101 leak detector) device or a methane detecting laser (LMD) 110. In some embodiments, one or more gas flow samplers, such as a HI FLOW Sampler (Bacharach, Inc.) may be provided for quantifying detected leaks. Further, in some embodiments, laser methane detectors (LMDs), such as SENSIT LMD (Sensit Technologies) or the like, may be used. For example, a diffracted feedback (DFB) laser diode tuned to a specific absorption wave length for methane gas in a Herriot cell sensor chamber may be used. As such, when the laser beam encounters methane molecules in a sensor chamber, a portion of the laser light is absorbed as the laser matches the absorption wavelength of methane. As a result, the LMD is unaffected by other hydrocarbons gases, chemicals, water or pollution.

Where leaks are detected, the leaks may be optionally be repaired immediately, or tagged/marked for repair at a later time 111 (e.g. as per a pre-determined schedule). Ambiguous tagging of leaks can lead to take significant amounts of time and result in tagging errors. For example, where a leak is detected at a joint comprising two threaded joints and a release coupling, the identification of the one to three possible leak locations is problematic. As such, in some embodiments, a serialized tag alone or in combination with directional markers straddling the particular leak location may be provided to improve the identification and tagging of the leak location. High-visibility tags, such as colourful tagging, may be provided on either side of the identified leak location, such tagging further having arrows denoted annotated thereon (pointing at each other) to identify the specific joint. The tag is affixed between the arrows, providing repair personnel with more accurate direction to the leak connection within the multiple possible connections. The tag is linked to the infrared thermography imaging results of that leak, location, type of connection and other observations regarding the leak. Tagging information may be uploaded to the controllers/processors, via a wired or wireless connection, along with the imaging information, and stored for further analysis and reporting. Once testing is completed and the closed system is completely pressurized to maximum pressures, the leak detection testing is completed 112.

Figure 3:
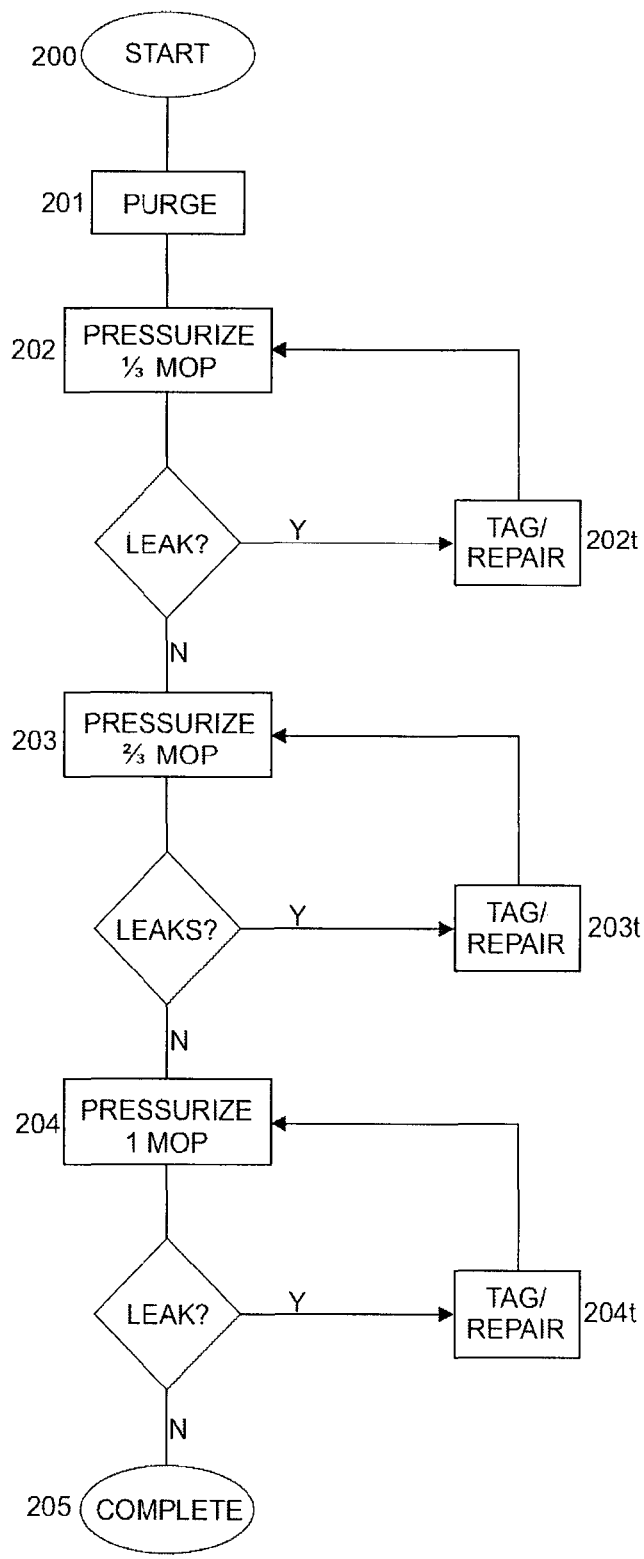
FIG. 3 is an example flowchart representing the present testing methods according to further embodiments herein.

Having regard to FIG. 3, an example gas leak survey scheme is provided 200, the scheme comprising a staged survey, wherein the closed system is pressured up and surveyed for leaks at each stage. As above, the scheme may commence by purging the closed system 201. In some embodiments, purging may be performed by introducing the present detector gas into the closed system. Having regard to the first stage 202, a first zone of the closed system may be pressurized to approximately one third of the maximum operating pressure (MOP') using the present detector gas, and leaks may be detected in the first pressurized zone using at least one infrared thermography camera, LMD, USD, or a combination thereof, as described above. The process may then be repeated within a second pressurized zone of the closed system 203, then a third pressurized zone of the closed system at maximum operating pressure 204.

As would be understood, where leaks are repaired as they are detected, the repair necessitates depressurization and re-pressurization of the system. Once repaired, the one or more pressurized zones having repaired leaks may be re-tested using the same process above 202,203,204 (i.e. re-pressurizing the zone to approximately ⅓ of the MOP). In some embodiments, the one or more pressurized zones may be re-tested at a higher testing pressure, such as approximately ⅔ of MOP and/or at full MOP. As above, leaks detected at any testing process 202,203,204, may be tagged for repair 202t,203t,204t. Once all detected leaks are repaired, the testing may be completed 205.

Although embodiments herein provide for the use of nitrogen carrier gas and methane tracer gas, it should be understood that there may be scenarios where the use of VOCs is prohibited within the closed system being surveyed for leaks. In such cases, where the use of methane or other VOCs may not be feasible, other tracer gases including, without limitation, carbon monoxide or carbon dioxide may be mixed with nitrogen carrier gas to provide the present detector gas. Accordingly, alternative embodiments of detector gases visualized by infrared thermography cameras are contemplated herein, provided that such cameras may be tuned to visualized such detector gases (e.g. to detect $CO_2$ or CO), either alone or in combination with LMDs configured to detect $CO_2$ or CO.

According to another Example, the present apparatus and methodologies may be specifically configured to provide a detector gas having a ratio of about 2% to about 14.2%, and preferably about 7.2% to about 10% nitrogen-to-methane, where both the carrier and tracer gases may be heated to elevated temperatures, such as to achieve a detector gas of at least 40° C.-50° C., and provided at pressures ranging from approximately 500 to 1000 psig. Detector gas flow rates may be at or near approximately 20 $m^3$/min. The present apparatus and methodologies provide an improved detector gas capable of flowing at high rates necessitated in high-volume systems, while also providing a balance between clarity of leak visualization and a buffer zone, and avoiding entering into combustible concentrations of methane (as described in detail below).

Figure 4:
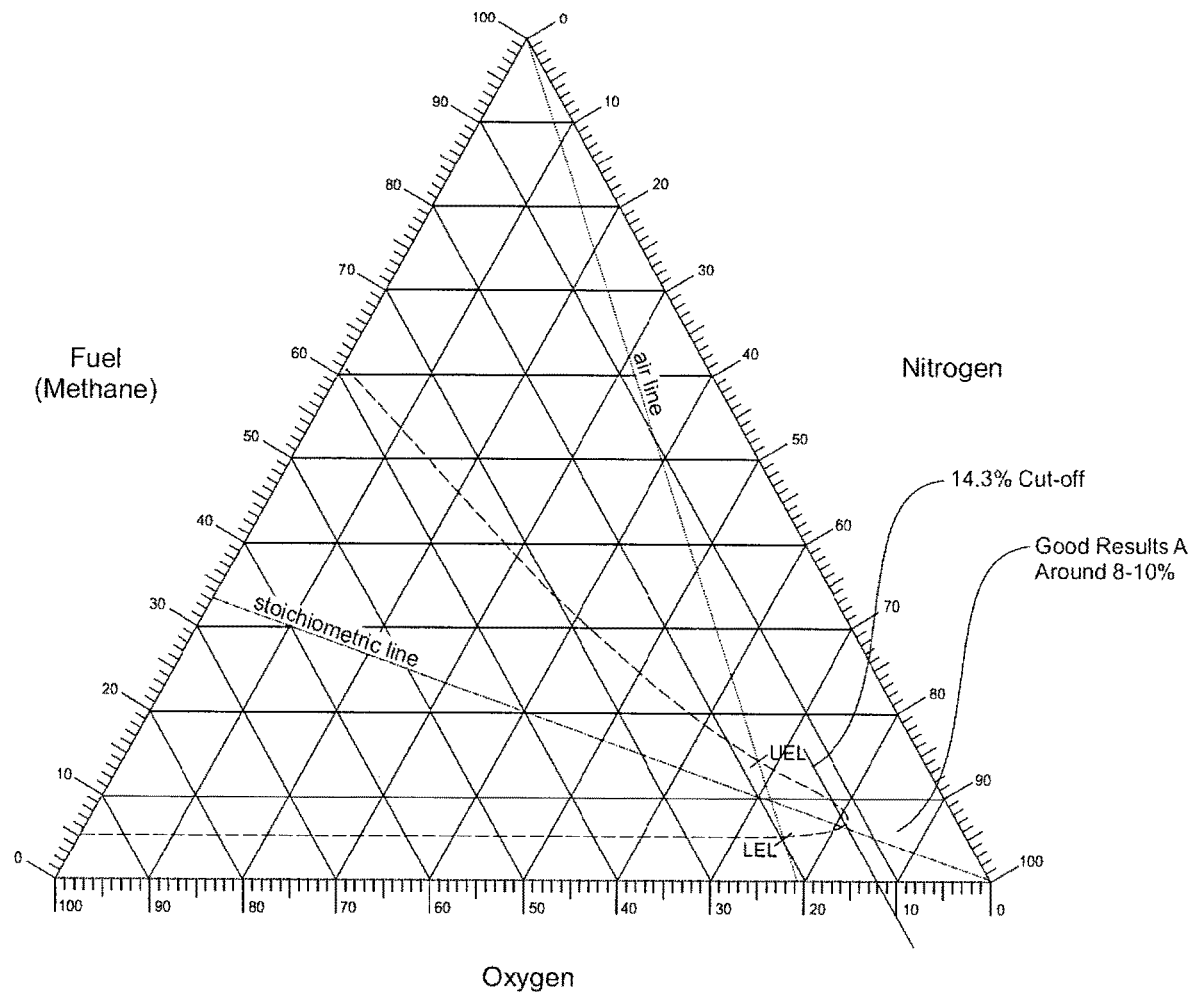
FIG. 4 is an example of a flammability diagram depicting the flammability of methane gas.
Figure 5A:
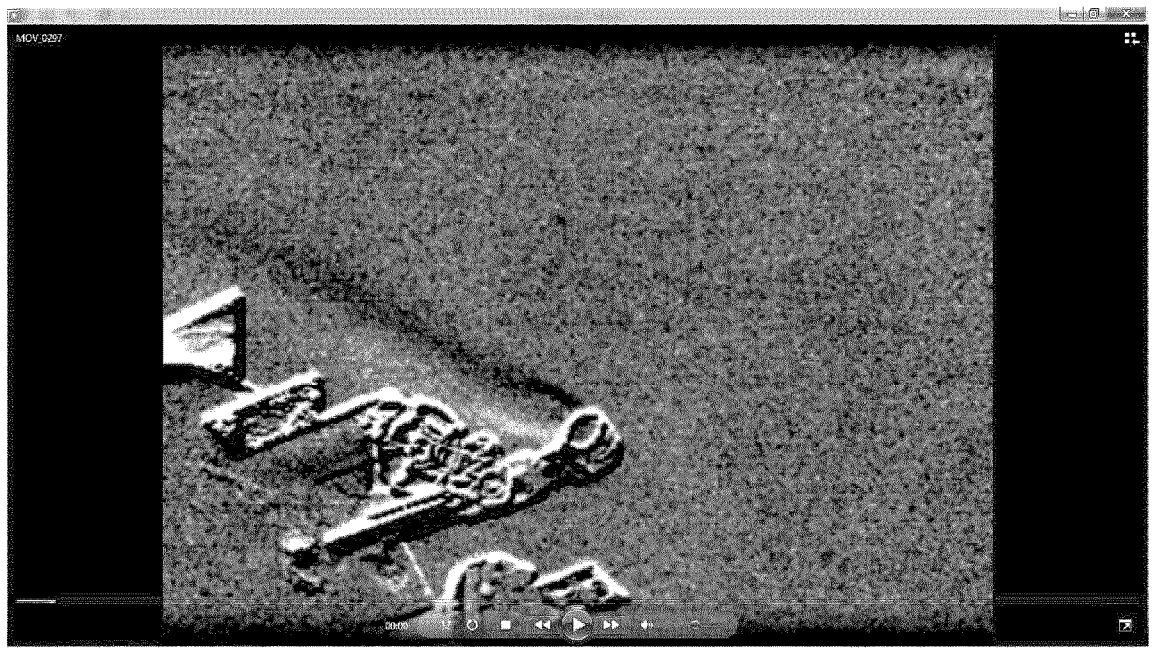
FIGS. 5A-5D comprise example images of a leaking valve in a closed system captured using infrared thermography imaging, the images illustrating a leak plume of the present detector gas from the valve (5A), the same leak plume where the valve is opened somewhat (5B), opened further (5C) and closed again (5D).
Figure 5B:
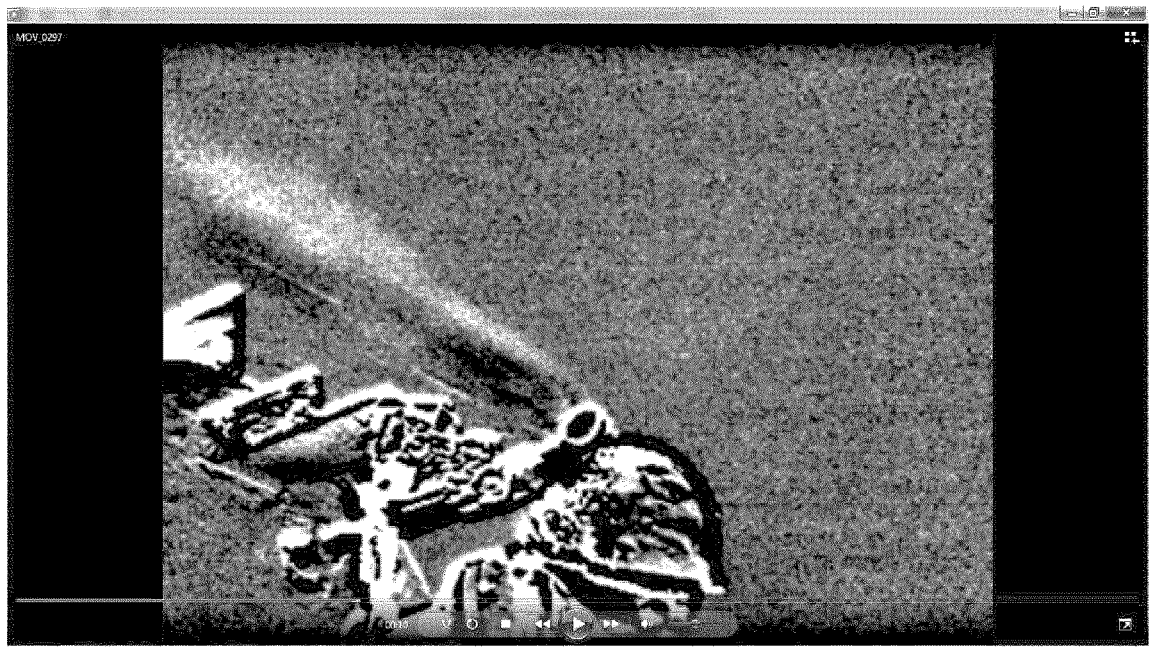
Figure 5C:
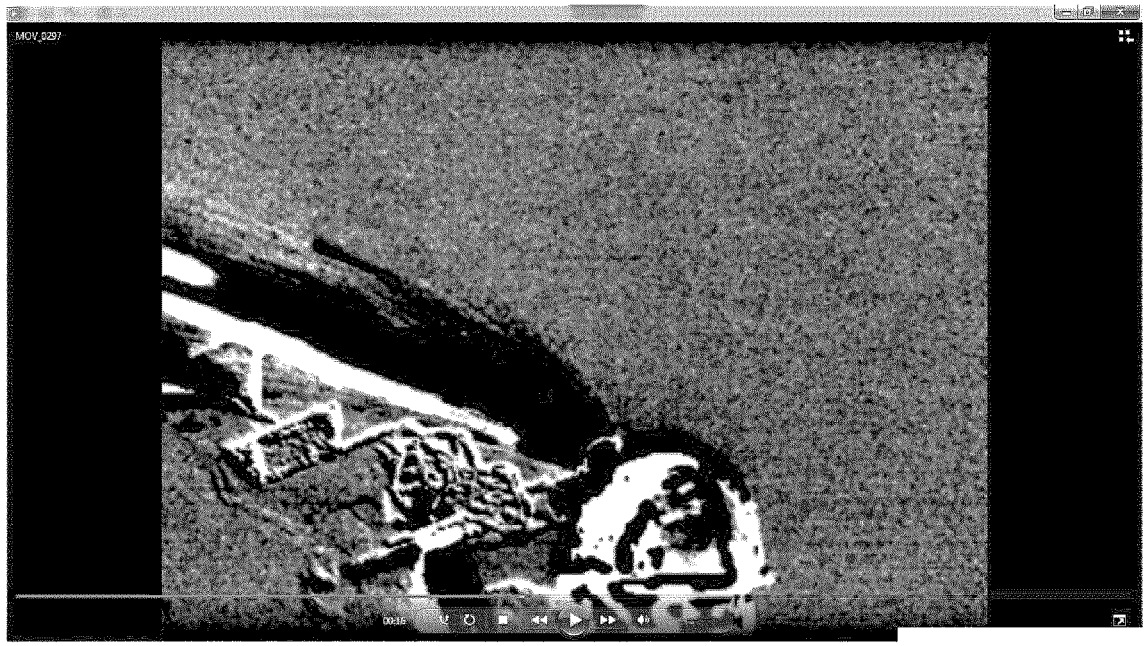
Figure 5D:
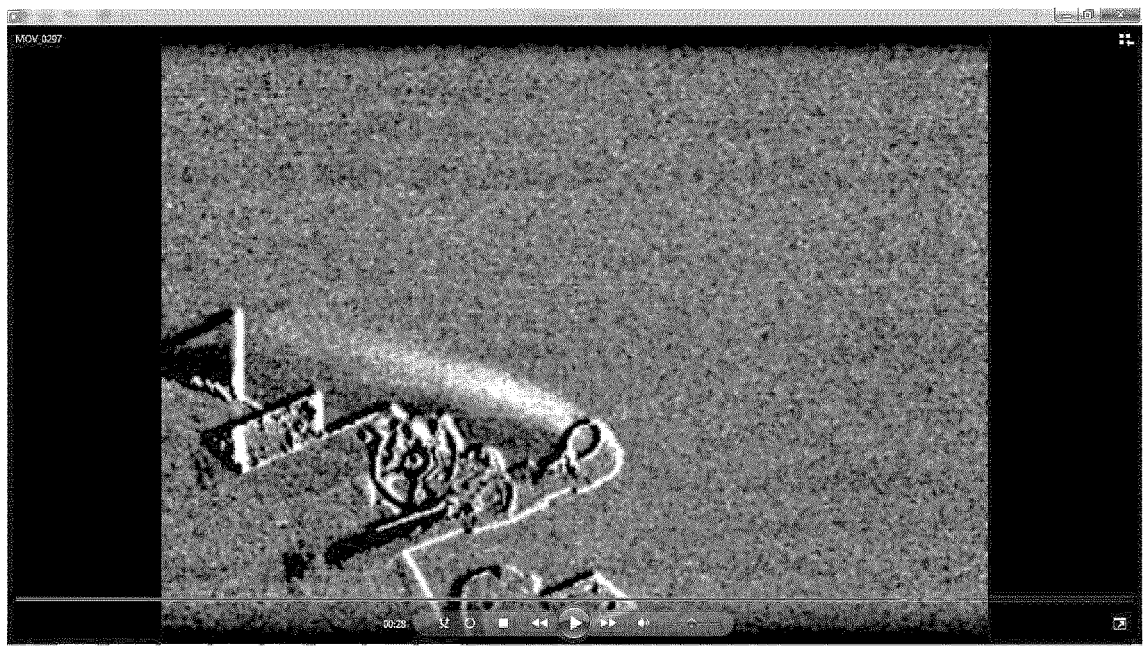

As depicted in the flammability diagram in FIG. 4, it is desirable to maintain a methane to nitrogen ratio of between about 7.2% to about 10%, to ensure that the detector gas remains to the right, and outside of, the flammability zone. For example, it has been observed that when detection gas produced by the present systems contains 14.3% methane or greater, the detection gas becomes flammable when the detection gas is exposed to air. Although such ratios of detection gas could still be used, it should be understood that the risk of using such ratios presents an increased risk of ignition. Preferably, the detector gas may consist of approximately 7.2% to 10% methane to nitrogen, thus allowing clear imaging but providing a buffer zone from the 14.3% combustion point. Having regard to FIGS. 5A-5D, the predetermined ratio of carrier-to-tracer detection gas may be modified and adapted, in real-time, for the particular closed system being surveyed (and in order to enhance the infrared thermography images of the leaked detector gas being obtained).

As above, it has been determined that the heating of both the carrier and tracer gases serves to provide the desired consistency of detection gas, and also prevents the freezing-off of system componentry, e.g. mixing spool, valves, regulators, etc. that can occur. In some embodiments, each of the carrier and tracer gases may be heated to elevated temperatures, such as to at least 40° C.-50° C., and preferably to 45° C. Although not optimal for the reasons described herein, it is contemplated that temperatures lower than 40° C. (e.g. as low as −40° C.), and as high as 100° C. may be used. Elevated temperatures of both gases also results in unimpeded flow of the detector gas. Finally, optically visibility of the detector gas with the one or more infrared thermography cameras is increased higher temperatures are achieved. Indeed, it has been discovered that, at certain elevated temperatures, gas leaks may become increasingly visible.

Combined flow rates of both carrier and tracer gases may be provided within the range of approximately 5 $m^3$/min to 40 $m^3$/min (although achieved flow rates could be as high as 300 $m^3$/min), and preferably at approximately 20 $m^3$/min. Table 1 provides the results of a series of tests performed to determine the effects of varying carrier flow rates, temperatures, and the percentage of tracer gas. Temperatures from atmospheric to 90° C., and gas flow rates from 5 $m^3$/min to 30 $m^3$/minute were tested.

| Carrier Gas Pumping Rate | Detector Gas (° C.) | Optimal % of Tracer Gas for Imaging |
| --- | --- | --- |
| 5 $m^3$/min | 45° C. | 7.2%-10% |
| 10 $m^3$/min | 45° C. | 7.2%-10% |
| 15 $m^3$/min | 45° C. | 7.2%-10% |
| 20 $m^3$/min | 50° C. | 7.2%-10% |
| 25 $m^3$/min | 50° C. | 7.2%-10% |
| 30 $m^3$/min | 50° C. | 7.2%-10% |

Surprisingly, it has been determined that, although introducing the detector gas at higher temperatures to the closed system can improve the clarity of infrared images (because, it is hypothesized, the infrared thermography cameras are able to detect the thermal energy of the detector gas in addition to the gas molecules themselves), if the carrier gas exceeds a particular temperature threshold (e.g. +100° C.), and the tracer gas is not at or near an equivalent temperature, the results produced by the detector gas are not reliable above a flow rate of 15 $m^3$/min. Indeed, in such cases, it has been observed that the resulting detector gas appears to be inconsistently blended, and produces 'slugs' of tracer gas. However, when the carrier and tracer gases are at or near similar temperatures, the resulting detector gas produces consistent images.

The terms and expressions herein are used as terms of description and not as limitation. Although the particular embodiments of the present systems described have been illustrated in the foregoing detailed description, it is to be further understood that the present invention is not to be limited to just the embodiments disclosed, but that they are capable of numerous rearrangements, modifications, and substitutions.

I claim:

1. A method of detecting a gas leak in a closed system, the method comprising:
    providing at least one carrier gas and at least one tracer gas,
    mixing at least a portion of the tracer gas and at least a portion of the carrier gas to form a detector gas having a specific ratio of carrier gas to tracer gas,
    determining, from a continuous sub-stream of the detector gas, the ratio of carrier gas to tracer gas within the detector gas, and
    adjusting the portion of the carrier gas, the portion of the tracer gas, or a combination thereof, to maintain the ratio of carrier gas to tracer gas within the detector gas,
    introducing the detector gas to the closed system, and
    obtaining infrared thermography images of the closed system to detect gas leaking from the system.

2. The method of claim 1, wherein determining the ratio of carrier gas to tracer gas in the produced detector gas comprises obtaining infrared thermography images of the sub-stream of detector gas.

3. The method of claim 1, wherein the carrier gas comprises an inert gas.

4. The method of claim 3, wherein the inert gas is nitrogen.

5. The method of claim 1, wherein the tracer gas comprises a natural gas.

6. The method of claim 5, wherein the tracer gas comprises methane gas.

7. The method of claim 1, further comprising heating the detector gas being produced prior to introducing the detector gas to the closed system.

8. The method of claim 7, wherein the detector gas is heated to at least between about 40° C.-about 50° C.

9. The method of claim 7, wherein the detector gas is heated to at least about 40° C.

10. The method of claim 1, wherein the mixing comprises introducing the at least one carrier gas and the at least one tracer gas to a static mixer.

11. The method of claim 1, wherein the ratio of carrier gas to tracer gas is in the range of about 2% to about 14.2%.

12. The method of claim 11, wherein the ratio of carrier gas to tracer gas is in the range of about 7.2% to about 10%.

13. The method of claim 1, wherein the detector gas is provided to the closed system at a volumetric flow rate in the range of about 5 m³/min to about 40 m³/min.

14. The method of claim 13, wherein the volumetric flow rate of the detector gas is provided to the closed system at a rate of about 20 m³/min.

15. An automated apparatus for detecting a gas leak in a closed system, the apparatus comprising:
a source of at least one carrier gas for supplying the at least one carrier gas to a carrier gas flow line,
a source of at least one tracer gas for supplying the at least one tracer gas to a tracer gas flow line,
at least one detector gas line, for receiving a detector gas comprising at least a portion of the at least one carrier gas and at least a portion of the at least one tracer gas, and transporting said detector gas to the closed system,
at least one controller, operably connected to the sources of carrier and tracer gases for continuously detecting and adjusting, in real-time, the ratio of carrier gas to tracer gas within the detector gas being produced, and
at least one infrared thermography camera for obtaining infrared thermography images of the closed system to detect detector gas leaking from the closed system.

16. The apparatus of claim 15, wherein the apparatus further comprises at least one mixer having an inlet end adapted to receive at least a portion of the carrier gas from the source of carrier gas and at least a portion of the tracer gas from the source of tracer gas.

17. The apparatus of claim 16, wherein the at least one mixer comprises a static mixer.

18. The apparatus of claim 15, wherein the apparatus further comprises one or more additional gas detection devices including gas chromatographers, mass spectrometers, laser methane detectors, or a combination thereof.

19. The apparatus of claim 15, wherein the apparatus comprises at least one control valve positioned along the carrier gas and tracer gas flow lines.

20. The apparatus of claim 19, wherein the at least one control valves comprises a gate valve or a ball valve.

21. The apparatus of claim 15, wherein the apparatus further comprises at least one secondary valve positioned along the tracer gas flow line.

22. The apparatus of claim 21, wherein the secondary valve comprises a needle valve.

23. The apparatus of claim 15, wherein the apparatus detects gas leaks in real-time.

* * * * *